United States Patent [19]
Skinner

[11] 3,973,444
[45] Aug. 10, 1976

[54] HAND-HELD OSCILLATING TOOL
[75] Inventor: Harold R. Skinner, Sylmar, Calif.
[73] Assignee: Textron, Inc., Valencia, Calif.
[22] Filed: Sept. 5, 1974
[21] Appl. No.: 503,229

[52] U.S. Cl. .................................. 74/54; 74/606 R
[51] Int. Cl.² ........................................ F16H 25/08
[58] Field of Search .................. 74/25, 54, 50, 606; 30/500, 90, 215, 217

[56] References Cited
UNITED STATES PATENTS

| 1,357,444 | 11/1920 | Cox .................................... 30/216 |
| 2,793,661 | 5/1957 | Olson .................................. 30/500 |
| 2,968,971 | 1/1961 | Beadle et al. ......................... 74/606 |
| 3,357,275 | 12/1967 | Green, Jr. et al. ................... 74/606 |
| 3,359,918 | 12/1967 | Casassa ................................ 74/54 |

FOREIGN PATENTS OR APPLICATIONS

| 728,507 | 4/1955 | United Kingdom ..................... 74/54 |

Primary Examiner—Benjamin W. Wyche
Assistant Examiner—Wesley S. Ratliff, Jr.
Attorney, Agent, or Firm—Nilsson, Robbins, Dalgarn & Berliner

[57] ABSTRACT

A hand-held tool connectable to an appropriate power source and providing an output oscillatory motion impartable to a tool such as a file or cutting device.

4 Claims, 3 Drawing Figures

HAND-HELD OSCILLATING TOOL

BACKGROUND OF THE INVENTION

In most cases where bores are formed in workpieces and particularly where there are other bores intersecting the same, there are commonly formed burrs of metallic material particularly at the points of intersection of the bores. These burrs must be removed from the workpiece prior to utilization in the desired application such as in fluid pressure apparatus. Often the location of the bores are relatively inaccessible and the burrs are very difficult to remove. In almost all cases, the removal in such inaccessible locations must be accomplished by hand. In the prior art, it has been customary for an operator to use very small deburring tools manipulatable solely by hand. As a result, such burr removal activities are extremely tedious, time-consuming and costly, as well as in many cases being somewhat ineffective. There is much prior art relating to oscillating abrading devices which are power driven and the most pertinent art known to applicant is as follows: U.S. Pat. Nos. 741,519; 927,450; 1,047,889; 1,048,683; 1,341,369; 2,307,431 and 2,567,856.

While prior art devices of the type illustrated in the above-referred-to patents particularly the patent to Gooch, U.S. Pat. No. 1,047,889, work well for the purposes intended, nonetheless, certain difficulties are inherent therein. The mechanical linkages utilized provide a certain amount of slack in the apparatus and also impart undesired vibration to the tool. As a result, imperfections or even damage may be imparted to a workpiece through utilization of such prior art tools.

SUMMARY OF THE INVENTION

A pair of housing halves define a cavity within which there is pivotally disposed a rocker arm having one end extending from the housing halves. Cam means is rotatably journaled in the cavity and engages one end of the rocker arm to pivot the same as the cam is rotated by the external power source. An appropriate tool is affixed to one end of the rocker arm to provide oscillatory motion thereto as the rocker arm is reciprocated by the rotating cam.

DETAILED DESCRIPTION

Figure 1:
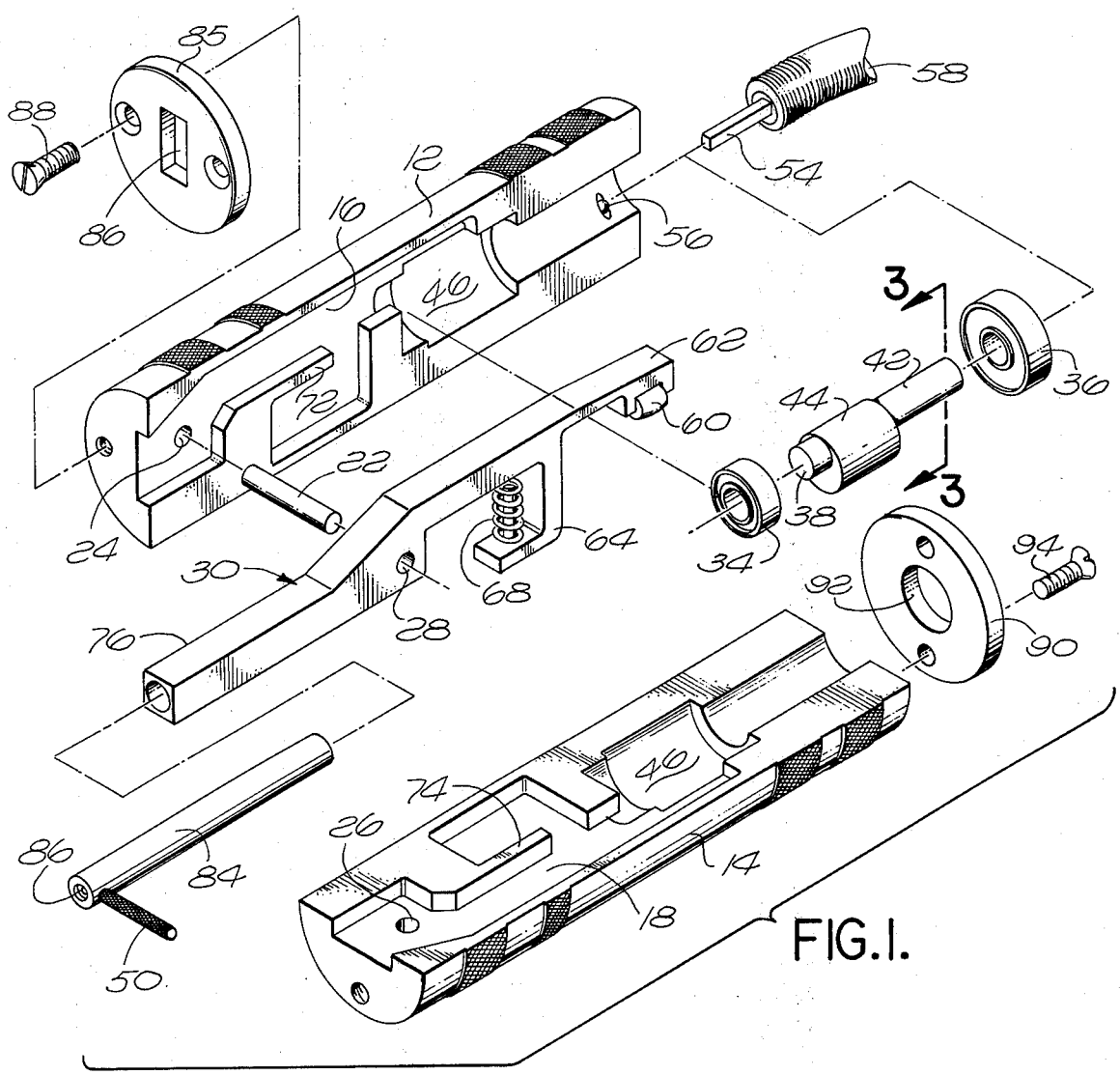
FIG. 1 is an exploded perspective view of an oscillating tool constructed in accordance with the present invention.

As illustrated in the drawings, there is provided a housing 10 defining a cavity 20 therein. A rocker arm 30 is pivotally disposed within the cavity 20 at a pivot point 32. Rotary power means 40 is also disposed in the cavity 20 and imparts motion to the rocker arm 30. As a result thereof, a tool member such as a file 50 which is affixed to one end of the rocker arm 30 is caused to reciprocally oscillate as illustrated by the arrow 52. The file 50 may be readily inserted into inaccessible points of a workpiece to thereby enable the operator to quickly and efficiently remove burrs or perform other operations as may be desired.

As is more fully illustrated in FIG. 1, the housing 10 includes housing halves 12 and 14, each of which is recessed as is illustrated at 16 and 18 to define the cavity 20. Although each of the housing halves 12 and 14 is illustrated as providing substantially one half of the cavity 20, it will be recognized by those skilled in the art that either half of the housing may be relieved to provide the entire cavity. Under such circumstances, the other portion of the housing would function as a cover closing side of the cavity. A pin 22 is received within an opening 24 defined within the main housing half 12 and within an opening 26 defined by the housing half 14. The pin 22 is inserted through an opening 28 defined by the rocker arm 30 to thereby define the pivot point 32 for the rocker arm 30.

Figure 3:
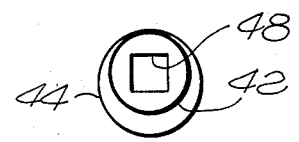
FIG. 3 is a view taken about the lines 3—3 of FIG. 1.
Figure 2:
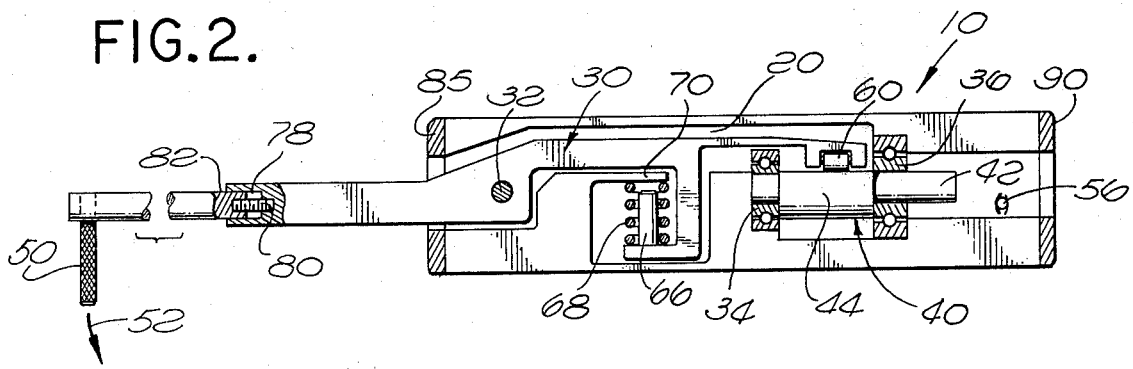
FIG. 2 is an elevation taken in cross-section of an oscillating tool constructed in accordance with the present invention.

A pair of bearing races 34 and 36 receive the spindles 38 and 42 of an eccentric cam 44. The subassembly of the bearing races 34 and 36 and the cam 44 is received within a portion 46 of the cavity 20 thereby to rotatably journal the cam 44 within the cavity 20. The spindle 42 defines a rectangular recess 48 as more specifically shown in FIG. 3 to receive a drive member 54. The drive member 54 is connected to a power source, not shown, as is well known in the art. A detent mechanism including a ball 56 is provided in one end of the housing half 12 for locking the cable 58 in position after the end 54 has been inserted into the opening 48.

A roller 60 is rotatably journaled upon the end 62 of the rocker arm 30 and is disposed to be in engagement with the surface of the cam 44. The roller 60 functions as a cam follower with minimum friction.

The rocker arm 30 includes a depending arm 64 upon which there is mounted a retainer pin 66 about which there is disposed a spring 68. The spring 68 is disposed to be in compression between the arm 64 and a wall 70 defined by the webs 72 and 74 on the housing halves 12 and 14, respectively. Thus, the spring 68 continuously urges the roller 60 into engagement with the surface of the cam 44.

The end 76 of the rocker arm 30 defines an opening 78 within which there is disposed screw threads 80. The opening 78 and the screw threads 80 cooperate to receive the end 82 of a tool holder 84 within which the file 50 is removably received. The file 50 may be held in place by an allen set screw or the like as illustrated at 86. By providing a tool holder which is removable from the end 76 of the rocker arm 30, various lengths and size tool holders may be utilized to enable the operator to reach any particular position desired within a workpiece.

Assembly of an oscillating tool constructed in accordance with the present invention is relatively simple to accomplish. The spring 68 is disposed upon the retainer 66, the pin 22 is inserted into the opening 24, the rocker arm is then assembled upon the pin 22 after which the assembly 40 is made and inserted into the cavity 46 by first depressing the end 76 of the rocker arm 30. Thereafter, a front end cap 85 is positioned over the rocker arm 30 by inserting the same through the opening. Thereafter, the front end cap 85 is retained in place by screws such as is illustrated at 88. A rear end cap 90 having an opening 92 through which the cable 58 is inserted is positioned in place and retained by screws such as at 94. As can also be seen by those skilled in the art, the oscillating tool of the present invention may be readily disassembled for repair or adjustment purposes. It will also be recognized that the various parts such as the housing and the rocker arm may be constructed of metal or any other suitable material such as molded plastic or the like depending upon the particular application to which the invention is to be applied.

What is claimed is:

1. A hand-held oscillating tool detachably connectable to an external power source comprising:
    a housing including first and second opposed housing members defining a cavity;
    undivided rocker arm means pivotally supported within said cavity and having one end portion thereof extending from said housing;
    eccentric cam means rotatably journaled within said cavity and engaging the opposite end of said rocker arm;
    means for receiving an external drive member to rotate said cam means;
    spring means disposed between said housing and said rocker arm means intermediate said opposite end and the pivotal support of said rocker arm means for continuously urging said opposite end of said rocker arm means into engagement with said cam means whereby upon rotation of said cam means said one end of said rocker arm means reciprocally oscillates; and
    attachment means on said one of said rocker arm means for attaching a tool thereto.

2. An oscillating tool as defined in claim 1 wherein said housing further includes only first and second end caps for securing said first and second housing members together.

3. An oscillating tool as defined in claim 1 wherein said spring means is a coil spring and said rocker arm means includes a depending arm, said spring being retained between said depending arm and said housing.

4. An oscillating tool as defined in claim 3 wherein said rocker arm at said other end includes a roller journaled therein, said roller engaging said cam means.

* * * * *